United States Patent [19]

Oh

[11] Patent Number: 5,563,778
[45] Date of Patent: Oct. 8, 1996

[54] UNINTERRUPTIBLE POWER SUPPLY SYSTEM

[75] Inventor: Chang K. Oh, Cheongju, Rep. of Korea

[73] Assignee: LG Industrial Systems Co., Ltd., Seoul, Rep. of Korea

[21] Appl. No.: 358,630

[22] Filed: Dec. 14, 1994

[30] Foreign Application Priority Data

Dec. 21, 1993 [KR] Rep. of Korea ................ 28837/1993

[51] Int. Cl.⁶ ........................................ H02M 5/45
[52] U.S. Cl. ................. 363/37; 336/145; 336/212; 307/48; 307/66
[58] Field of Search .................. 363/37, 65; 307/42, 307/48, 58, 64–66, 82, 83; 336/145, 188, 189, 199, 212, 221

[56] References Cited

U.S. PATENT DOCUMENTS 4,308,495 12/1981 Yasumura ................ 323/250
4,860,185 8/1989 Brewer et al. ................ 363/41
5,334,877 8/1994 Mohan et al. ................ 307/46
5,353,001 10/1994 Meinel et al. ................ 336/83

Primary Examiner—Peter S. Wong
Assistant Examiner—Adolf Berhane
Attorney, Agent, or Firm—Oliff & Berridge

[57] ABSTRACT

An improved uninterruptible power supply system includes a converter for converting alternating current voltage into a direct current voltage; an inverter for modulating the direct current voltage outputted from a battery or the converter; a first switch for switching the voltage modulated at the inverter; a second switch for switching the alternating voltage inputted via a bypass line; an integrated transformer for increasing or decreasing the output voltages of the first and the second switches, the transformer also acting as a reactor for shaping the output voltage of the first switch; and a condenser for shaping the waveforms of the output voltage of the integrated transformer.

5 Claims, 5 Drawing Sheets

UNINTERRUPTIBLE POWER SUPPLY SYSTEM

BACKGROUND OF THE INVENTION

1. Field of the Invention

The present invention relates to an uninterruptible power supply(UPS) system, and more particularly to an improved uninterruptible power supply system advantageously including a transformer for increasing or decreasing voltage obtained from an inverter and a bypass line to a predetermined level, another transformer for decreasing voltage thereof, and an integrated transformer having a reactor.

2. Description of the Conventional Art

Conventionally, almost all applied electronic instruments might be damaged by abrupt interruptions in power supply. In an attempt to prevent those kinds of damage, uninterruptible power supply(UPS) systems are usually used.

Referring to FIG. 1, a conventional uninterruptible power supply system includes a converter 10 for convening three-phase alternating current voltage into direct current voltage, a battery 20, connected to a ground, for charging direct current voltage converted at the converter 10, an inverter 30 for modulating direct current voltage outputted from the converter 10 or the battery 20, an LC filter 40 for shaping waveforms of voltage modulated by the inverter 30, a first switch 50 for supplying an output voltage to an externally connected electrical load such as an electronic appliance by selectively switching the flow of the output voltage of the LC filter 40, a second transformer 60 for decreasing the voltage of the three-phase alternating current voltage inputted through a bypass line, and a second switch 70 for supplying output voltage to the externally connected load by selectively switching the flow of the output voltage of the second transformer 60.

The LC filter 40 includes a reactor 41 for shaping waveforms of voltage outputted from the inverter 30, a first transformer 43 for increasing the voltage outputted through the reactor 41, and a condenser C1 for shaping waveforms of the voltage increased by the first transformer 43.

Referring to FIG. 3, the reactor 41 includes a first inductor L1 and a second inductor L2 in which the output line the inverter 30 are wound onto the core 42 in series.

Referring to FIG. 2, the first transformer 43 and the second transformer 60 output a voltage V2 of the secondary coil which varies with the winding ratio of the primary and secondary coils which are wound onto the core 44.

The detailed operation of the uninterruptible power supply system according to the present invention will now be explained.

To begin with, the converter 10 receives the three-phase alternating current voltage of 220 V, converts the three-phase alternating current voltage into a direct current voltage and then outputs the direct current voltage to the battery 20 and the inverter 30.

Thereafter, the battery 20 charges the inputted direct current voltage and outputs the direct current voltage into the inverter 30. The inverter 30 modulates the direct current voltage and outputs a single-phase alternating current voltage of 80 V. The single-phase alternating current voltage of 80 V is inputted into the first transformer 43 through the first and second inductors L1 and L2. Here, the first transformer 43 increases the inputted single-phase alternating current voltage up to 110 V.

In addition, the waveforms of the alternating current voltage which is increased by the first transformer 43 are converted into a sine waveform by the LC filter 40 formed of the inductors L1 and L2 and the condenser C1.

Thereafter, the first switch 50 applies the voltage outputted from the LC filter 40 to the electrical load by selectively switching the flow of the voltage.

Meanwhile, the three-phase alternating current voltage of 220 V is also inputted into the second transformer 60 through the bypass line. Here, the second transformer 60 decreases the 220 V input voltage to 110 V and inputs the decreased voltage into the second switch 70. Therefore, when any malfunction occurs during use of the uninterruptible power supply system, the first switch 50 is cut off and then the second switch 70 supplies the voltage of 110 V to the electrical load.

However, according to the conventional uninterruptible power supply system, the first transformer for increasing the output voltage of the inverter 30, the reactor 41 for shaping the waveforms of the output voltage of the inverter 30 into a sine waveform, and the second transformer 60 are separately disposed from one another therein, so that a simple and light construction thereof cannot be obtained, and in addition in assembling the system, many wiring lines are needed.

SUMMARY OF THE INVENTION

Accordingly, it is an object of the present invention to provide an improved uninterruptible power supply system.

It is another object of the present to provide an uninterruptible power supply system including an integrated transformer for increasing or decreasing the voltages from an inverter means and a bypass line to a predetermined level, and for acting as a reactor.

To achieve the above objects, the present invention includes a converter for converting alternating current voltage into direct current voltage; an inverter for modulating direct current voltage outputted from a battery or the converter; a first switch for switching the voltage modulated at the inverter; a second switch for switching the alternating voltage inputted through the bypass line; an integrated transformer for increasing or decreasing the output voltages of the first and the second switch, said transformer is also acting as a reactor for shaping the output voltage of the first switch; and a condenser for shaping the waveforms of the output voltage of the integrated transformer.

DESCRIPTION OF THE PREFERRED EMBODIMENTS

Figure 1:
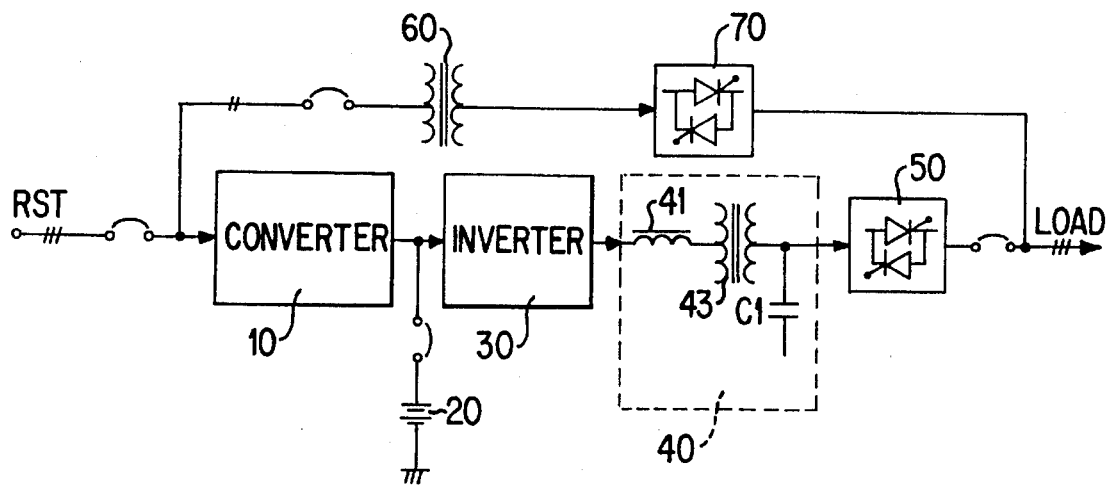
FIG. 1 is a block diagram showing a conventional uninterruptible power supply system.
Figure 2:
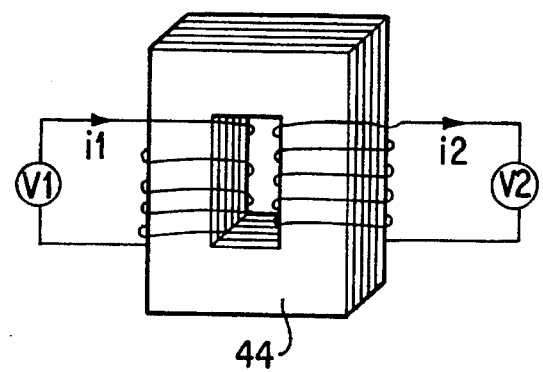
FIG. 2 is a perspective view showing a first and second transformer of FIG. 1.
Figure 3:
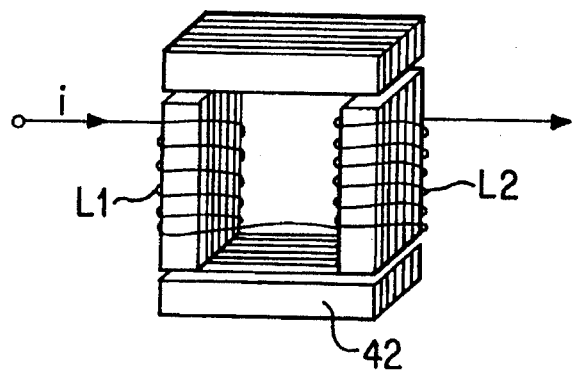
FIG. 3 is a perspective view showing a first and second reactor of FIG. 1.
Figure 4:
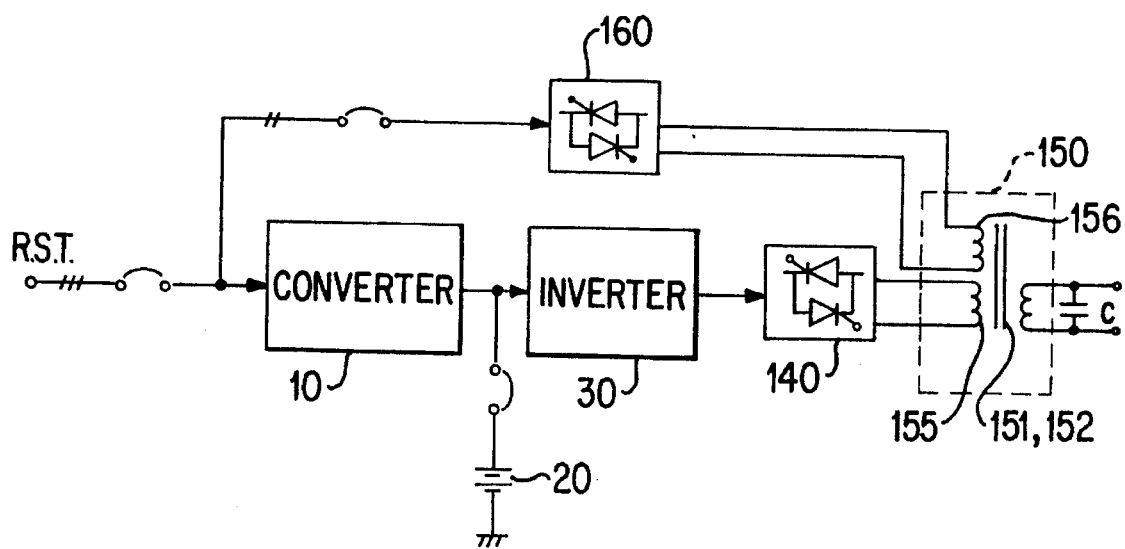
FIG. 4 is a block diagram showing an uninterruptible power supply system according to the present invention.

Referring to FIG. 4, the uninterruptible power supply system of the present invention includes a converter for converting three-phase alternating current voltage into direct current voltage, a battery 20 connected to a ground, for charging the direct current voltage converted at the converter 10, an inverter 30 for modulating the direct current voltage outputted from the battery 20 and the converter 10, a first switch 140 for selectively passing the voltage modulated at the inverter 30, a second switch 160 for selectively passing the three-phase alternating current voltage inputted through a bypass line, an integrated transformer 150 for increasing or decreasing the voltage passed by the first switch 140 or the second switch 160 to a predetermined level and which acts as a reactor in order to shape the waveforms of the output voltage of the first switch 140, and a condenser C for shaping the waveforms of the output voltage of the integrated transformer 150.

Figure 5:
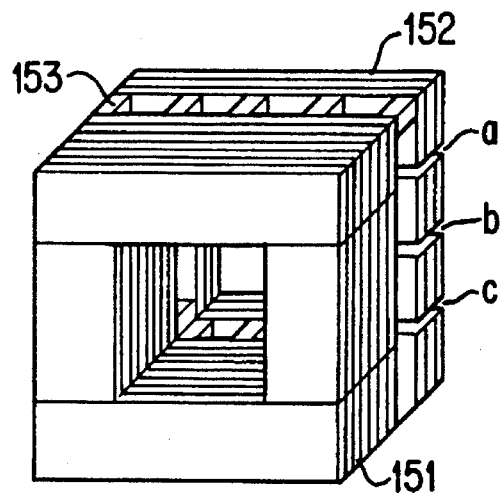
FIG. 5 is a perspective view showing a core used in an integrated transformer of FIG. 4.
Figure 6:
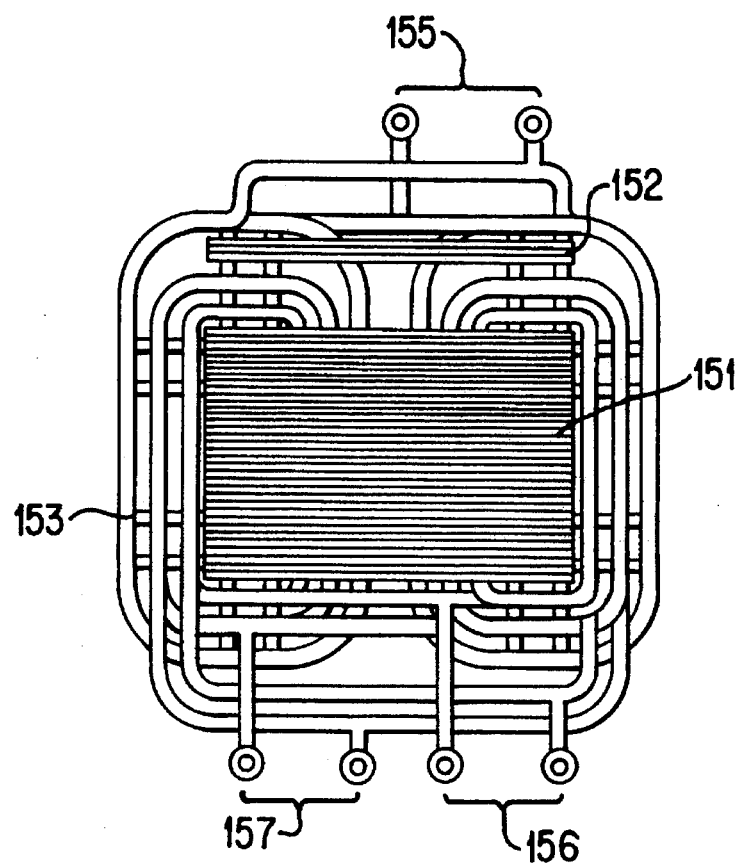
FIG. 6 is a top view showing a coil wound in the core of FIG. 5.
Figure 7:
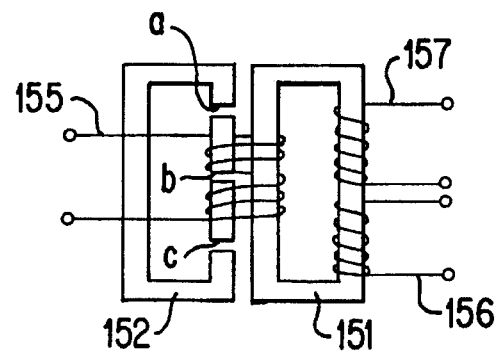
FIG. 7 is a view showing a winding of FIG. 6.

Referring to FIGS. 5 to 7, the integrated transformer 150 includes first and second cores 151 and 152 which are separated from each other a predetermined distance by an insulated spacer 153, a plurality of gaps a, b and c which are respectively formed at the lower, the middle, and the upper portions of the second core 152, a first coil 155 wound onto the first and second cores 151 and 152 together for receiving the alternating current voltage outputted from the inverter 30 and for acting as a reactor when the electrical load connected to the condenser C is not operated, a second coil 156 wound onto the first core 151 for receiving the voltage outputted from the second switch 160, a third coil 157 wound onto the first core 151 for supplying the output voltage to an external load such as an electronic instrument by increasing or decreasing the voltage generated at the first and second coils 155 and 156.

Referring to FIGS. 4 to 7, the detailed operation and effects of the uninterruptible power supply system according to the present invention will now be explained.

To begin with, the operation of the converter 10, the battery 30 and the inverter 30 are the same as that of the conventional art. In addition, the first switch 140 is directed to input the alternating voltage of 80 V outputted from the inverter 30 into the integrated transformer 150 or cut off the alternating current voltage of 80 V so that the current voltage of 80 V is not inputted into the integrated transformer 150.

The alternating current voltage of 80 V is supplied to the first coil 155 which is wound onto the first and second cores 151 and 152. At this time, in the case that the electrical load connected to the condenser C is not operated, a magnetic force is generated at the first core 151. Here, the first coil 155 and the third coil 157 respectively operate as the primary and secondary windings of the transformer and then the 80 V alternating current voltage is increased up to 110 V in accordance with the winding ratio of the first and third coils 155 and 157. In addition, the 110 V alternating current voltage filtered by the condenser is outputted.

Meanwhile, in the case that the electrical load connected to the condenser C is operated, a magnetic force is generated at the second core 152. Therefore, a reactance is generated at the plurality of gaps a, b, and c of the second core 152, so that the first coil 155 acts as a reactor 155 on one side of the transformer. In addition, the 80 V alternating current voltage is increased up to 110 V in accordance with the winding ratio of the first coil 155 and the third coil 157. Thereafter, the waveforms of the alternating current voltage increased to 110 V is shaped to a sine waveform by the LC filter formed of the first coil 155 and the condenser C.

Meanwhile, when supply damage occurs in the uninterruptible power supply system, the output voltage of the inverter 140 is cut off by the first switch 140 and the second switch 160 passes the alternating current voltage of 220 V inputted through the bypass line. In addition, the alternating current voltage of 220 V is inputted into the second coil 156 wound onto the first core 151 of the integrated transformer.

Accordingly, the second coil 156 and the third coil 157 which are wound onto the first core 151 respectively acts as the primary coin and the secondary windings of the transformer, so that the 220 V alternating current voltage is decreased down to 110 V in accordance with the winding ratio of the second coil 156 and the third coil 157. In addition, the 100 V alternating current voltage filtered by the condenser C is outputted to the externally connected applied electronic instruments.

Figure 8:
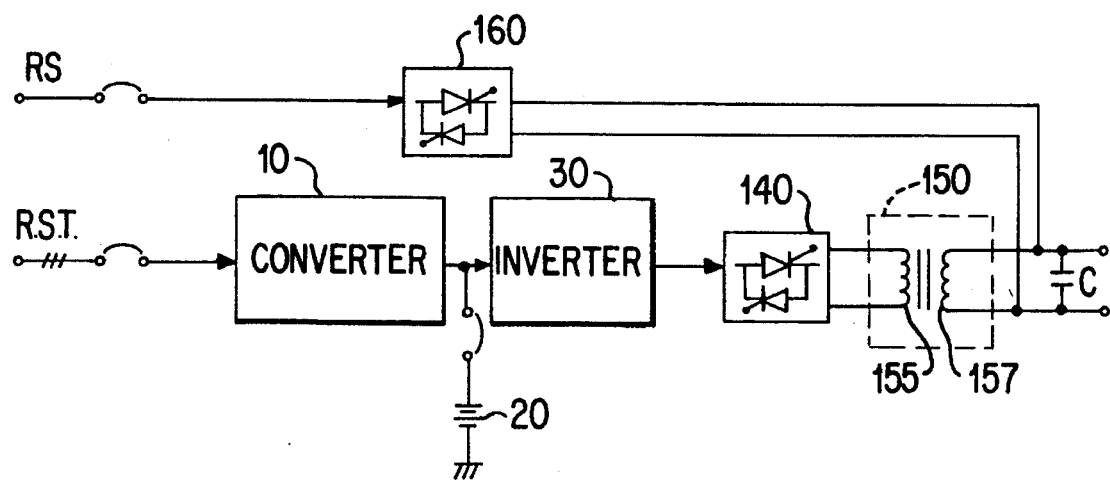
FIG. 8 is a block diagram showing another embodiment of the uninterruptible power supply system according to the present invention.
Figure 9:
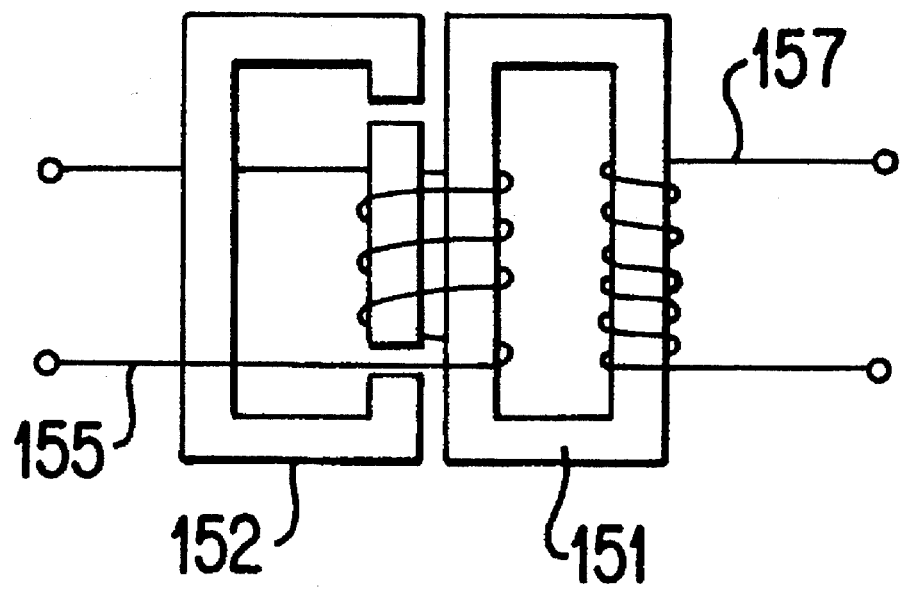
FIG. 9 is a view showing a winding of an integrated transformer of FIG. 8.

Referring to FIG. 8, another embodiment of the present invention is shown directed to supply a voltage of 110 V to the externally connected electronic instrument through the bypass line. Accordingly, in the integrated transformer 150' shown in FIG. 9, the second coil 156 of the integrated transformer 150 in FIGS. 5-7 is eliminated.

Since the uninterruptible power supply system of the present invention advantageously combines the first transformer and the second transformer into the integrated transformer together with the reactor, the simplicity and lightness thereof can thereby be obtained and in addition when in assembling the system, only minimum of wiring lines are needed.

What is claimed is:

1. An uninterruptible power supply system, comprising:
    converter means for converting an alternating current voltage into a direct current voltage;
    inverter means for modulating direct current voltage outputted from a battery or from the converter means;
    first switch means for switching the voltage modulated by the inverter means;
    second switch means for switching an alternating voltage inputted through a bypass line;
    an integrated transformer for increasing or decreasing output voltages of the first switch means and the second switch means, and for acting as a reactor, so that the output voltage of the first switch means is shaped, wherein said integrated transformer comprises:
        first and second cores spaced apart from each other by a predetermined distance;
        a first coil wound onto the first and second cores and having a reactance, for receiving an output voltage of the first switch means;
        a second coil wound onto the first core, for receiving an output voltage of the second switch means; and
        a third coil wound onto the first core, for outputting a voltage induced from therein the first coil or the second coil; and
    a condenser for shaping the waveforms of the output voltage of the integrated transformer.

2. The system of claim 1, wherein said first and second cores are separated from each other by a spacer which is made of an insulated material.

3. The system of claim 1, wherein said second core includes at least one gap therein.

4. The system of claim 1, wherein said first coil and said third coil act as a primary coil and a secondary coil respectively of said integrated transformer when the system is not supplying power, whereas said first coil acts as a reactor and as a primary coil of said integrated transformer when the system is supplying power.

5. An uninterruptible power supply system, comprising:

converter means for converting an alternating current voltage into a direct current voltage;

inverter means for modulating direct current voltage outputted from a battery or from the converter means;

first switch means for switching the voltage modulated by the inverter means;

second switch means for switching an alternating voltage inputted through a bypass line;

an integrated transformer for increasing or decreasing output voltages of the first switch means and the second switch means, and for acting as a reactor, so that the output voltage of the first switch means is shaped, wherein said integrated transformer includes:

first and second cores spaced apart from each other by a predetermined distance;

a first coil wound onto the first and second cores and having a reactance, for receiving an output voltage of the first switch means; and a second coil wound onto the first core, for outputting a voltage induced from therein the first coil or the second coil; and a condenser for shaping the waveform of the output voltage of the integrated transformer or the output voltage of the second switch means.

* * * * *